(12) United States Patent
Obrovac et al.

(10) Patent No.: US 7,767,349 B2
(45) Date of Patent: Aug. 3, 2010

(54) ALLOY COMPOSITIONS FOR LITHIUM ION BATTERIES

(75) Inventors: Mark N. Obrovac, St. Paul, MN (US); Jeffrey R. Dahn, Hubley (CA); Richard Mar, Halifax (CA); Michael D. Fleischauer, Fergus (CA)

(73) Assignee: 3M Innovative Properties Company, St. Paul, MN (US)

( * ) Notice: Subject to any disclaimer, the term of this patent is extended or adjusted under 35 U.S.C. 154(b) by 1168 days.

(21) Appl. No.: 11/387,557

(22) Filed: Mar. 23, 2006

(65) Prior Publication Data

US 2007/0020528 A1 Jan. 25, 2007

Related U.S. Application Data

(60) Provisional application No. 60/702,361, filed on Jul. 25, 2005.

(51) Int. Cl.
*H01M 6/18* (2006.01)
(52) U.S. Cl. ............... 429/322; 429/122; 29/623.1; 420/548; 420/580
(58) Field of Classification Search ........... 429/322
See application file for complete search history.

(56) References Cited

U.S. PATENT DOCUMENTS

| | | | |
|---|---|---|---|
| 2,755,178 | A | 7/1956 | Rasmusen |
| 5,504,128 | A | 4/1996 | Mizutani et al. |
| 5,536,599 | A | 7/1996 | Alamgir et al. |
| 5,709,968 | A | 1/1998 | Shimizu |
| 5,763,119 | A | 6/1998 | Adachi |
| 5,858,573 | A | 1/1999 | Abraham et al. |
| 5,882,812 | A | 3/1999 | Visco et al. |
| 5,900,385 | A | 5/1999 | Dahn et al. |
| 6,001,507 | A | 12/1999 | Ono et al. |
| 6,004,698 | A | 12/1999 | Richardson et al. |
| 6,045,952 | A | 4/2000 | Kerr et al. |
| 6,090,505 | A | 7/2000 | Shimamura et al. |
| 6,203,944 | B1 | 3/2001 | Turner et al. |

(Continued)

FOREIGN PATENT DOCUMENTS

EP   0 883 199 A1   12/1998

(Continued)

OTHER PUBLICATIONS

Davies, "Metallic glass formation", *Amorphous Metallic Alloys*, Chapter 2, pp. 8-25, F. E. Luborsky, ed., Butterworth & Co., 1983.

(Continued)

*Primary Examiner*—Patrick Ryan
*Assistant Examiner*—Brent Thomas
(74) *Attorney, Agent, or Firm*—Jean A. Lown; Stephen F. Wolf

(57) ABSTRACT

Alloy compositions are described for use in anodes of lithium ion batteries. The alloy compositions contain (a) tin, (b) a second element that includes silicon, aluminum, or a combination thereof, (c) a third element that includes yttrium, a lanthanide element, an actinide element, or a combination thereof and an optional alkaline earth element, and (d) an optional transition metal. The alloy compositions are amorphous and remain amorphous even after multiple cycles of lithiation and delithiation.

20 Claims, 4 Drawing Sheets

U.S. PATENT DOCUMENTS

| | | | |
|---|---|---|---|
| 6,214,177 B1 | 4/2001 | Runkle | |
| 6,235,427 B1 * | 5/2001 | Idota et al. | 429/218.1 |
| 6,387,571 B1 | 5/2002 | Lain et al. | |
| 6,428,933 B1 | 8/2002 | Christensen et al. | |
| 6,432,585 B1 | 8/2002 | Kawakami et al. | |
| 6,436,578 B2 | 8/2002 | Turner et al. | |
| 6,506,520 B1 | 1/2003 | Inoue et al. | |
| 6,506,524 B1 | 1/2003 | McMillan et al. | |
| 6,548,208 B1 | 4/2003 | Kasamatsu et al. | |
| 6,551,744 B1 | 4/2003 | Ohzuku et al. | |
| 6,599,663 B2 | 7/2003 | Hashimoto et al. | |
| 6,680,145 B2 | 1/2004 | Obrovac et al. | |
| 6,699,336 B2 | 3/2004 | Turner et al. | |
| 6,730,434 B1 | 5/2004 | Kawakami et al. | |
| 6,949,312 B1 * | 9/2005 | Kawakami et al. | 429/218.1 |
| 6,964,828 B2 | 11/2005 | Lu et al. | |
| 7,078,128 B2 | 7/2006 | Lu et al. | |
| 7,169,328 B2 | 1/2007 | Miller et al. | |
| 2002/0031708 A1 | 3/2002 | Krause et al. | |
| 2002/0162606 A1 | 11/2002 | Turner et al. | |
| 2003/0108793 A1 | 6/2003 | Dahn et al. | |
| 2003/0134198 A1 | 7/2003 | Sawa et al. | |
| 2003/0148185 A1 * | 8/2003 | Kusumoto et al. | 429/233 |
| 2004/0058240 A1 | 3/2004 | Christensen | |
| 2004/0121234 A1 | 6/2004 | Le | |
| 2004/0179993 A1 | 9/2004 | Dahn et al. | |
| 2005/0112054 A1 | 5/2005 | Eberman et al. | |
| 2005/0191556 A1 | 9/2005 | Kim et al. | |
| 2005/0221196 A1 | 10/2005 | Dahn et al. | |
| 2006/0099506 A1 | 5/2006 | Krause et al. | |
| 2006/0263695 A1 | 11/2006 | Dahn et al. | |
| 2006/0263697 A1 | 11/2006 | Dahn et al. | |

FOREIGN PATENT DOCUMENTS

| | | |
|---|---|---|
| EP | 1 028 476 A1 | 8/2000 |
| EP | 1 039 568 A1 | 9/2000 |
| EP | 1 274 140 A1 | 1/2003 |
| JP | 61-066369 | 4/1986 |
| JP | 10-046299 | 2/1998 |
| JP | 10208741 A | 8/1998 |
| JP | 2000-113912 | 4/2000 |
| JP | 2001-015102 | 1/2001 |
| JP | 2001-256974 | 9/2001 |
| JP | 2001-297757 | 10/2001 |
| JP | 2002-075351 | 3/2002 |
| JP | 2003-346793 | 12/2003 |
| JP | 2003346793 A1 * | 12/2003 |
| JP | 2004-193005 | 7/2004 |
| WO | WO 94/11138 | 5/1994 |
| WO | WO 99/49532 | 9/1999 |
| WO | WO 00/14817 | 3/2000 |
| WO | WO 00/33402 | 6/2000 |
| WO | WO 01/29920 A1 | 4/2001 |
| WO | WO 01/52337 A1 | 7/2001 |
| WO | WO 02/052664 A2 | 7/2002 |
| WO | WO 2004/086539 A1 | 10/2004 |
| WO | WO 2005/013397 A1 | 2/2005 |
| WO | WO 2006/028583 A2 | 3/2006 |

OTHER PUBLICATIONS

Wilson et al., "Lithium Insertion in Carbons Containing Nanodispersed Silicon", *J. Electrochem. Soc.*, vol. 142, No. 2, Feb. 1995, pp. 326-332.

Yang et al., "Small particle size multiphase Li-alloy anodes for lithium-ion-batteries", *Solid State Ionics* 90 (1996) 281-287.

Besenhard et al., "Will advanced lithium-alloy anodes have a chance in lithium-ion batteries?", *Journal of Power Sources* 68 (1997) 87-90.

Dahn et al., "Economical Sputtering System to Produce Large-Size Composition-Spread Libraries Having Linear and Orthogonal Stoichiometry Variations", *Chem. Mater.*, 14, 2002, pp. 3519-3523.

Egashira et al., "Properties of containing Sn nanoparticles activated carbon fiber for a negative electrode in lithium batteries", *Journal of Power Sources* 107 (2002) 56-60.

Beaulieu et al., "The Electrochemical Reaction of Li with Amorphous Si-Sn Alloys", *J. Electrochem. Soc.*, 150 (2) A149-A156 (2003).

Cumyn et al., "Design and Testing of a Low-Cost Multichannel Pseudopotentiostat for Quantitative Combinatorial Electrochemical Measurements on Large Electrode Arrays", *Electrochemical and Solid-State Letters*, 6 (6) E15-E18 (2003).

Fleischauer et al., "Design and Testing of a 64-Channel Combinatorial Electrochemical Cell", *J. Electrochem. Soc.*, 150 (11) A1465-A1469 (2003).

Sakaguchi et al., "Ce-Sn intermetallic compounds as new anode materials for rechargeable lithium batteries", *Journal of Power Sources* 119-121 (2003) 50-55.

Tirado, "Inorganic materials for the negative electrode of lithium-ion batteries: state-of-the-art and future prospects", *Materials Science and Engineering R* 40 (2003) 103-136.

Obrovac et al., "Structural Changes in Silicon Anodes during Lithium Insertion/Extraction", *Electrochemical and Solid-State Letter*, 7 (5) A93-A96 (2004).

Dahn et al., "The Impact of the Addition of Rare Earth Elements to $Si_{1-x}Sn_x$ Negative Electrode Materials for Li-Ion Batteries", *J. Electrochem. Soc.*, 153 (6) A1211-A1220 (2006).

Dahn et al., "Rechargeable Lithium-ion Cell with Triphenylamine Redox Shuttle", U.S. Appl. 60/743,314, filed Feb. 17, 2006.

* cited by examiner

ALLOY COMPOSITIONS FOR LITHIUM ION BATTERIES

RELATED APPLICATIONS

This application claims priority from U.S. Provisional Application No. 60/702,361, which was filed on Jul. 25, 2005 and is hereby incorporated by reference.

FIELD OF THE INVENTION

Alloy compositions for lithium ion battery are described.

BACKGROUND

Rechargeable lithium ion batteries are included in a variety of electronic devices. Most commercially available lithium ion batteries have anodes that contain materials such as graphite that are capable of incorporating lithium through an intercalation mechanism during charging. Such intercalation-type anodes generally exhibit good cycle life and coulombic efficiency. However, the amount of lithium that can be incorporated per unit mass of intercalation-type material is relatively low.

A second class of anode material is known that incorporates lithium through an alloying mechanism during charging. Although these alloy-type materials can often incorporate higher amounts of lithium per unit mass than intercalation-type materials, the addition of lithium to the alloy is usually accompanied with a large volume change. Some alloy-type anodes exhibit relatively poor cycle life and coulombic efficiency. The poor performance of these alloy-type anodes may result from the formation of a two-phase region during lithiation and delithiation. The two-phase region can create internal stress within the alloy if one phase undergoes a larger volume change than the other phase. This internal stress can lead to the disintegration of the anode material over time.

Further, the large volume change accompanying the incorporation of lithium can result in the deterioration of electrical contact between the alloy, conductive diluent (e.g., carbon) particles, and binder that typically form the anode. The deterioration of electrical contact, in turn, can result in diminished capacity over the cycle life of the anode.

SUMMARY

Alloy compositions, lithium ion batteries, and methods of making lithium ion batteries are described. More specifically, the lithium ion batteries have anodes that contain an alloy-type material that is amorphous. The lithium ion batteries typically have high initial capacities that can be retained even after repeated cycles of lithiation and delithiation.

In a first aspect, a lithium ion battery is described that contains a cathode, an anode, and an electrolyte that is in electrical communication with both the anode and the cathode. The anode includes an amorphous alloy composition that contains (a) tin, (b) a second element that includes silicon, aluminum, or a combination thereof, (c) a third element that includes yttrium, a lanthanide element, an actinide element, or a combination thereof and an optional alkaline earth element, and (d) an optional transition metal. The alloy contains tin in an amount of 1 to 50 mole percent, the second element in an amount of 20 to 95 mole percent, the third element in an amount of 3 to 50 mole percent, and the optional transition metal in an amount of 0 to 1 mole percent based on a total number of moles of all elements except lithium in the alloy composition.

In a second aspect, a method of making a lithium ion battery is described that includes providing an anode that contains an amorphous anode composition, providing a cathode, and providing an electrolyte that is in electrical communication with both the anode and the cathode. The alloy composition contains (a) tin, (b) a second element that includes silicon, aluminum, or a combination thereof, (c) a third element that includes yttrium, a lanthanide element, an actinide element, or a combination thereof and an optional alkaline earth element, and (d) an optional transition metal. The alloy contains tin in an amount of 1 to 50 mole percent, the second element in an amount of 20 to 95 mole percent, the third element in an amount of 3 to 50 mole percent, and the optional transition metal in an amount of 0 to 1 mole percent based on a total number of moles of all elements except lithium in the alloy composition.

In a third aspect, an alloy composition is described. The alloy composition is amorphous and contains (a) tin, (b) a second element that includes silicon, aluminum, or a combination thereof, (c) a third element that includes yttrium, a lanthanide element, an actinide element, or a combination thereof and an optional alkaline earth element, and (d) an optional transition metal. The alloy contains tin in an amount of 1 to 50 mole percent, the second element in an amount of 20 to 95 mole percent, the third element in an amount of 3 to 50 mole percent, and the optional transition metal in an amount of 0 to 1 mole percent based on a total number of moles of all elements except lithium in the alloy composition.

As used herein, the terms "a", "an", and "the" are used interchangeably with "at least one" to mean one or more of the elements being described.

The term "amorphous" refers to a material that lacks the long range atomic order characteristic of crystalline material, as determined using x-ray diffraction.

The term "electrochemically active" refers to a material that reacts with lithium under conditions typically encountered during charging and discharging of a lithium ion battery. The electrochemically active material is usually in the form of a metal or alloy.

The term "electrochemically inactive" refers to a material that does not react with lithium under conditions typically encountered during charging and discharging of a lithium ion battery. The electrochemically inactive material is usually in the form of a metal or alloy.

The term "metal" refers to both metals and metalloids such as silicon and germanium. The metal is often in an elemental state. An "intermetallic" compound is a compound that contains at least two metals.

The term "lithiation" refers to the process of adding lithium to the alloy composition (i.e., lithium ions are reduced).

The term "delithiation" refers to the process of removing lithium from the alloy composition (i.e., lithium atoms are oxidized).

The term "charging" refers to a process of providing electrical energy to a battery.

The term "discharging" refers to a process of removing electrical energy from a battery (i.e., discharging is a process of using the battery to do useful work).

The term "capacity" refers to the amount of lithium that can be incorporated per unit mass of the active anode material (e.g., the alloy composition). The term "specific capacity" refers to the capacity per unit mass of the anode material and has units of milliamp-hour/gram (mAh/g).

The term "cathode" refers to the electrode where electrochemical reduction occurs during the discharging process. During discharging, the cathode undergoes lithiation. During charging, lithium atoms are removed from this electrode.

The term "anode" refers to the electrode where electrochemical oxidation occurs during the discharging process. During discharging, the anode undergoes delithiation. During charging, lithium atoms are added to this electrode.

As used herein, a "number in the range of" includes the endpoints of the range and all the numbers between the endpoints. For example, a number in the range of 1 to 10 includes 1, 10, and all the numbers between 1 and 10.

The above summary is not intended to describe each disclosed embodiment or every implementation of the present invention. The detailed description section that follows more particularly exemplifies these embodiments.

BRIEF DESCRIPTION OF THE DRAWINGS

The invention can be more completely understood in consideration of the following detailed description of various embodiments of the invention in connection with the accompanying drawings, in which.

Figure 1:
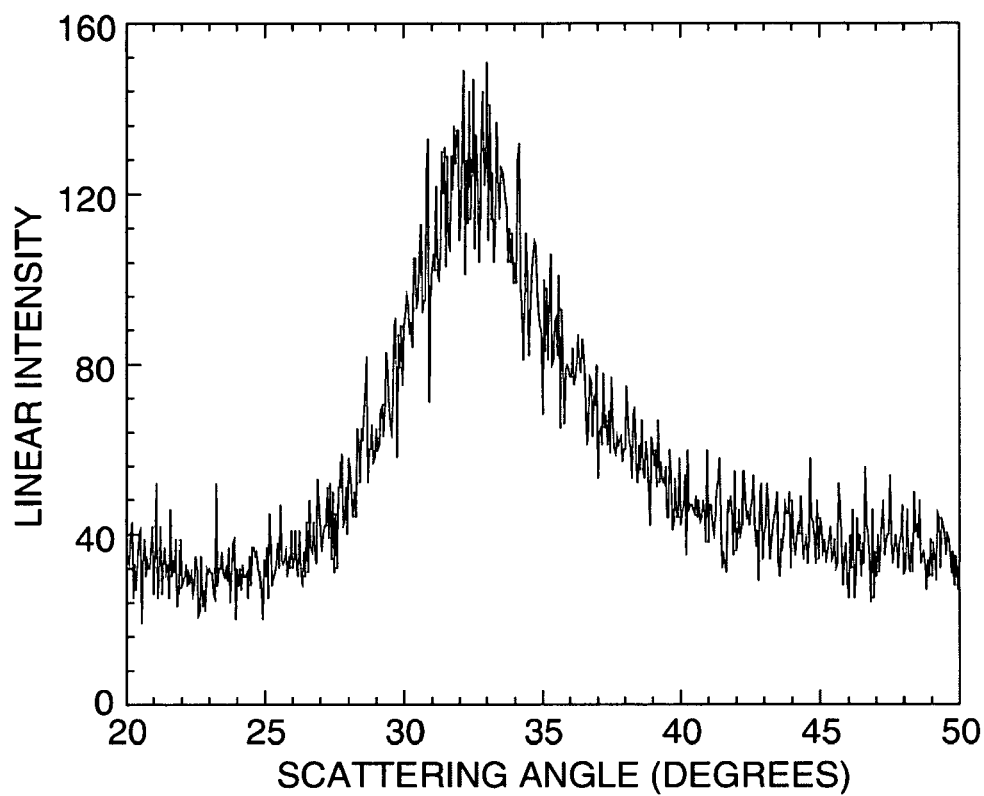
FIG. 1 is a x-ray diffraction pattern of an exemplary alloy composition of $Al_{60}Sn_{20}(MM)_{15}Ca_5$ where MM is a mischmetal.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Alloy compositions are described that can be included in the anode of a lithium ion battery. The alloy compositions are amorphous and remain amorphous even after repetitive cycles of lithiation and delithiation. Compared to alloy compositions that are crystalline, the use of amorphous materials can advantageously minimize the risk of anode disintegration due to volume changes that can occur during lithiation and delithiation. The amorphous materials do not form a two-phase region during lithiation or delithiation that can lead to the disintegration of particles.

In one aspect, lithium ion batteries are provided that include a cathode, an anode, and an electrolyte that is in electrical communication with both the cathode and the anode. The anode contains an amorphous alloy composition that remains amorphous even after repetitive cycles of lithiation and delithiation. The alloy composition contains (a) tin, (b) a second element that includes silicon, aluminum, or a combination thereof, (c) a third element that includes yttrium, a lanthanide element, an actinide element, or a combination thereof and an optional alkaline earth element, and (d) an optional transition metal.

The entire alloy composition is typically amorphous and does not contain a crystalline phase that can be detected using x-ray diffraction. The amorphous nature of the alloy compositions can be characterized by the absence of sharp peaks, which are characteristic of crystalline materials, in the x-ray diffraction pattern. The x-ray diffraction pattern can have broad peaks, such as a broad peak having a peak width at half the maximum peak height corresponding to at least 5 degrees two theta, at least 10 degrees two theta, or at least 15 degrees two theta using a copper target (i.e., Kα1 radiation, Kα2 radiation, or combination thereof) as the x-ray source. The x-ray diffraction pattern is free of peaks having a peak width at half the maximum peak height that is less than 5 degrees two theta using a copper target as the x-ray source.

The alloy composition is amorphous at ambient temperatures such as at temperatures in the range of 10° C. to 50° C. The alloy composition is amorphous before undergoing a cycle of lithiation and delithiation and remains amorphous after at least ten cycles of lithiation and delithiation. Some alloy compositions remain amorphous after at least 100, at least 500, or at least 1000 cycles of lithiation and delithiation.

The specific capacity (i.e., the capacity per gram) of the alloy compositions is usually at least 200 mAh/g. In some embodiments, the specific capacity can be at least 300 mAh/g, at least 400 mAh/g, at least 600 mAh/g, at least 800 mAh/g, at least 1000 mAh/g, at least 1200 mAh/g, at least 1400 mAh/g, at least 1600 mAh/g, at least 1800 mAh/g, or at least 2000 mAh/g. The specific capacity is typically measured during the discharging portion of the second cycle of lithiation and delithiation.

As used herein, the term "mole percent" when referring to constituents of the alloy composition is calculated based on a total number of moles of all elements in the alloy composition except lithium. For example, the mole percent tin in an alloy that contains tin, a second element, a third element, and an optional transition metal is calculated by multiplying the moles of tin by 100 and dividing the product by the total moles of all elements except lithium in the alloy composition (e.g., moles of tin+moles of second element+moles of third element+moles of optional transition metal).

Tin is present in an amount of 1 to 50 mole percent based on the total number of moles of all elements in the alloy composition except lithium. Tin is an electrochemically active element that can undergo lithiation. The amount of tin affects the kinetics of lithiation as well as the capacity. Higher levels of tin tend to increase the rate of lithiation and the capacity. An increased rate of lithiation can diminish the amount of time needed to charge a battery. If the amount of tin is increased too much, however, a crystalline phase containing tin (e.g., elemental tin) can form in the alloy composition. The presence of a crystalline phase can, at least in some embodiments, have a detrimental impact on the capacity when the anode is subjected to repetitive cycles of lithiation and delithiation. A decreased capacity lowers the time a battery can be used before it needs to be recharged.

The alloy composition can include at least 1 mole percent, at least 5 mole percent, at least 10 mole percent, or at least 15 mole percent tin. The alloy composition can include up to 50 mole percent, up to 45 mole percent, up to 40 mole percent, up to 35 mole percent, up to 30 mole percent, up to 25 mole percent, or up to 20 mole percent tin. For example, the alloy compositions can contain 1 to 40 mole percent, 1 to 30 mole percent, 1 to 20 mole percent, 10 to 40 mole percent, 10 to 30 mole percent, 10 to 25 mole percent, 15 to 30 mole percent, or 15 to 25 mole percent tin.

The alloy composition contains a second element that includes silicon, aluminum, or a combination thereof present in an amount of 20 to 95 mole percent based on the total number of moles of all elements in the alloy composition except lithium. At least some of the second element is electrochemically active. If the amount of the second element in the alloy composition is too low, the capacity can be unacceptably low. If the amount of the second element is too high, however, the second element can crystallize. A crystalline phase can, at least in some embodiments, detrimentally affect the capacity when the anode is subjected to repetitive lithiation and delithiation cycles. That is, the capacity can decrease with successive cycles of lithiation and delithiation.

In some alloy compositions, all of the second element is electrochemically active. In other alloy compositions, a portion of the second element is electrochemically active and a portion of the second element is electrochemically inactive. Any portion of the second element that is electrochemically inactive can function as a matrix that does not undergo lithiation or delithiation during charging or discharging of a lithium ion battery.

In some alloy compositions, the second element is present in an amount of 20 to 90 mole percent, 20 to 80 mole percent, 20 to 70 mole percent, 20 to 60 mole percent, 20 to 50 mole percent, 20 to 40 mole percent, 30 to 90 mole percent, 40 to 90 mole percent, 50 to 90 mole percent, 60 to 90 mole percent, 70 to 90 mole percent, 30 to 80 mole percent, 40 to 80 mole percent, 30 to 70 mole percent, or 40 to 70 mole percent.

In some exemplary alloy compositions, the second element is silicon and the silicon is present in an amount of at least 40 mole percent, at least 45 mole percent, at least 50 mole percent, or at least 55 mole percent. The silicon can be present in an amount up to 90 mole percent, up to 85 mole percent, or up to 80 more percent. For example, the alloy composition can contain 40 to 90 mole percent, 45 to 90 mole percent, 50 to 90 mole percent, 55 to 90 mole percent, 40 to 80 mole percent, 50 to 80 mole percent, or 55 to 80 mole percent silicon.

In other exemplary alloy compositions, the second element is aluminum and the aluminum is present in an amount of at least 40 mole percent, at least 45 mole percent, at least 50 mole percent, or at least 55 mole percent. The aluminum can be present in an amount up to 90 mole percent, up to 80 mole percent, up to 70 mole percent, up to 65 mole percent, or up to 60 mole percent. For example, the alloy composition can contain 40 to 90 mole percent, 50 to 90 mole percent, 55 to 90 mole percent, 50 to 80 mole percent, 55 to 80 mole percent, 50 to 70 mole percent, 55 to 70 mole percent, 50 to 65 mole percent, or 55 to 65 mole percent aluminum.

In still other exemplary alloy compositions, the second element is a mixture of silicon and aluminum. The amount of silicon can be greater than, less than, or equal to the amount of aluminum in alloy composition. Higher levels of silicon tend to increase the capacity of the alloy composition. Higher levels of aluminum can lower the melting point of the alloy composition, which facilitates the use of a greater variety of processing techniques such as melt processing techniques (e.g., melt spinning). In some alloy compositions, aluminum is present in an amount of 50 to 70 mole percent and silicon is present in an amount up to 20 mole percent. For example, the alloy compositions can contain 50 to 70 weight percent aluminum and 1 to 15 mole percent silicon or 55 to 65 weight percent aluminum and 1 to 10 mole percent silicon.

The alloy composition contains 3 to 50 mole percent of a third element based on the total moles of all elements in the alloy composition except lithium. The third element includes yttrium, a lanthanide element, an actinide element, or a combination thereof and can further include an optional alkaline earth element. The third element reacts more readily with tin than the second element and facilitates the incorporation of tin into the amorphous phase. If too much of the third element is included in the alloy composition, the resulting alloy composition is often not air stable and the capacity tends to become too small due to the formation of an electrochemically inactive intermetallic compound between silicon and the third element. If too little of the third element is included in the alloy composition, however, crystalline tin (e.g., elemental tin) can be present in the alloy composition. The presence of crystalline tin, at least in some embodiments, can disadvantageously reduce the capacity with each repetitive cycle of lithiation and delithiation.

The third element usually does not combine with silicon from the second element to form a stoichiometric compound such as a silicide. A stoichiometric compound has a defined ratio between the elements in the compound with the ratio being a rational number. As used herein with respect to a stoichiometric compound, the term "substantially free" means that such a compound cannot be detected using techniques such as x-ray diffraction.

The third element can include yttrium, a lanthanide element, an actinide element, or a combination thereof. Suitable lanthanide elements include lanthanum, cerium, praseodymium, neodymium, promethium, samarium, europium, gadolinium, terbium, dysprosium, holmium, erbium, thulium, ytterbium, and lutetium. Suitable actinide elements include thorium, actinium, and protactinium. Some alloy compositions contain a lanthanide elements selected, for example, from cerium, lanthanum, praseodymium, neodymium, or a combination thereof.

The third element can be a mischmetal, which is an alloy of various lanthanides. Some mischmetals contain, for example, 45 to 60 weight percent cerium, 20 to 45 weight percent lanthanum, 1 to 10 weight percent praseodymium, and 1 to 25 weight percent neodymium. Other exemplary mischmetals contain 30 to 40 weight percent lanthanum, 60 to 70 weight percent cerium, less than 1 weight percent praseodymium, and less than 1 weight percent neodymium. Still other exemplary mischmetals contain 40 to 60 weight percent cerium and 40 to 60 weight percent lanthanum. The mischmetal often includes small impurities (e.g., no more than 3 weight percent, no more than 2 weight percent, not more than 1 weight percent, no more than 0.5 weight percent, or no more than 0.1 weight percent) such as, for example, iron, magnesium, silicon, molybdenum, zinc, calcium, copper, chromium, lead, titanium, manganese, carbon, sulfur, phosphorous, and the like. The mischmetal often has a lanthanide content of at least 97 weight percent, at least 98 weight percent, or at least 99 weight percent. One exemplary mischmetal that is commercially available from Alfa Aesar, Ward Hill, Mass. with 99.9 weight percent purity contains approximately 50 weight percent cerium, 18 weight percent neodymium, 6 weight percent praseodymium, 22 weight percent lanthanum, and 3 weight percent other rare earths.

The alloy composition contains at least 3 mole percent, at least 4 mole percent, at least 5 mole percent, or at least 10 mole percent lanthanide element, actinide element, yttrium, or a combination thereof. The alloy composition often contains up to 50 mole percent, up to 40 mole percent, up to 30 mole percent, up to 25 mole percent, or up to 20 mole percent lanthanide, actinide element, yttrium or a combination thereof.

The third element can optionally further include an alkaline earth element such as, for example, magnesium, calcium, barium, strontium, or a combination thereof. In some alloy compositions, the alkaline earth element is calcium. The amount of calcium can be present in any amount up to 20 mole percent. Some alloy compositions contain an alkaline earth element in an amount up to 15 mole percent, up to 10 mole percent, or up to 5 mole percent.

The alloy composition typically contains up to 50 mole percent, up to 40 mole percent, up to 30 mole percent, up to 25 mole percent, or up to 20 mole percent of the third element. For example, the alloy composition can contain 3 to 50 mole percent, 4 to 40 mole percent, 4 to 30 mole percent, or 4 to 25 mole percent of the third element.

The alloy composition is substantially free of transition metal. As used herein, the term "substantially free of a transition metal" refers to an alloy composition that contains up to 1 mole percent transition metal, up to 0.5 mole percent transition metal, up to 0.3 mole percent transition metal, up to 0.2 mole percent transition metal, or up to 0.1 mole percent transition metal. The transition metal is typically not purposefully added to the alloy composition but is present as an impurity in one of the other constituents of the alloy composition. For example, the lanthanide element such as mischmetal can include small amounts of transition metals as impurities.

The alloy compositions are often of Formula I

$$Sn_a Si_b Al_c M_d A_e T_f Li_g \qquad (I)$$

where a is an number in the range of 1 to 50; b is a number in the range of 0 to 95; c is a number in the range of 0 to 95; the sum b+c is a number in the range of 20 to 95; M is yttrium, a lanthanide element, actinide element, or a combination thereof; d is a number in the range of 3 to 50; A is an alkaline earth element; e is a number in the range of 0 to 20; the sum d+e is a number in the range of 3 to 50; T is a transition metal; f is a number in the range of 0 to 1; and the sum of a+b+c+d+e+f is equal to 100. The variable g can range from 0 to a number that is equal to [4.4(a+b)+c].

In some exemplary alloy compositions according to Formula I, the variable a is a number in the range of 10 to 40; b is a number in the range of 40 to 90; c is a number no greater than 5; d is a number in the range of 5 to 15; e is a number in the range of 0 to 10; and f is a number in the range of 0 to 1. For example, in the alloy composition according to Formula I, the variable a is a number in the range of 10 to 40; b is a number in the range of 55 to 80; c is a number no greater than 3; d is a number in the range of 5 to 15; e is a number in the range of 0 to 10; and f is a number in the range of 0 to 1. As another example, the variable a is a number in the range of 10 to 40; b is a number in the range of 55 to 80; c is a number no greater than 1; d is a number in the range of 5 to 15; e is a number in the range of 0 to 10; and f is a number in the range of 0 to 1.

In other exemplary alloy compositions the variable a is a number in the range of 10 to 40; b is a number no greater than 5; c is a number in the range of 40 to 90; d is a number in the range of 10 to 20; e is a number in the range of 0 to 10; and f is a number in the range of 0 to 1. For example, the variable a is a number in the range of 10 to 40; b is a number in the range of 55 to 80; c is a number no greater than 3; d is a number in the range of 5 to 15; e is a number in the range of 0 to 10; and f is a number in the range of 0 to 1. As another example, the variable a is a number in the range of 10 to 40; b is a number in the range of 55 to 80; c is a number no greater than 1; d is a number in the range of 5 to 15; e is a number in the range of 0 to 10; and f is a number in the range of 0 to 1.

In still other exemplary alloy compositions, the variable a is a number in the range of 15 to 25; b is a number in the range of 1 to 15; c is a number in the range of 50 to 70; d is a number in the range of 10 to 20; e is a number in the range of 0 to 10; and f is a number in the range of 0 to 1. For example, the variable a is a number in the range of 15 to 25; b is a number in the range of 1 to 15; c is a number in the range of 55 to 65; d is a number in the range of 10 to 20; e is a number in the range of 0 to 10; and f is a number in the range of 0 to 1. As another example, the variable a is a number in the range of 15 to 25; b is a number in the range of 1 to 10; c is a number in the range of 55 to 65; d is a number in the range of 10 to 20; e is a number in the range of 0 to 10; and f is a number in the range of 0 to 1.

The alloy composition can be in the form of a thin film or powder, the form depending on the technique chosen to prepare the materials. Suitable methods of preparing the alloy compositions include, but are not limited to, sputtering, chemical vapor deposition, vacuum evaporation, melt spinning, splat cooling, spray atomization, electrochemical deposition, and ball milling.

Sputtering is an effective procedure for producing amorphous alloy compositions. The different elements can be sputtered simultaneously or sequentially. For example, the elements can be sequentially sputter-coated on a substrate such as a copper substrate. The substrates can be positioned near the edge of a turntable (e.g., 25 inch diameter) that rotates continuously below multiple sputtering sources that are operating continuously. A layer of one material can be deposited as the substrate passes under the first sputtering source, and additional layers of different material can be deposited as the substrate passes under the other sputtering sources. The amount of material deposited from each sputtering source can be controlled by varying the rotation speed of the turntable and by varying the sputtering rates. Suitable sputtering methods are further described in U.S. Pat. No. 6,203,944 B1 (Turner et al.); U.S. Pat. No. 6,436,578 B1 (Turner et al.); and U.S. Pat. No. 6,699,336 B2 (Turner et al.), all of which are incorporated herein by reference.

Melt processing is another procedure that can be used to produce amorphous alloy compositions. Such processes are described generally, for example, in *Amorphous Metallic Alloys*, F. E. Luborsky, ed., Chapter 2, Butterworth & Co., Ltd., 1983. According to this process, ingots containing the alloy composition can be melted in a radio frequency field and then ejected through a nozzle onto a surface of a rotating wheel (e.g., a copper wheel). Because the surface temperature of the rotating wheel is substantially lower than the temperature of the melt, contact with the surface of the rotating wheel quenches the melt. Rapid quenching minimizes the formation of crystalline material and favors the formation of amorphous materials. Suitable melt processing methods are further described in U.S. Pat. No. 6,699,336 B2 (Turner et al.), incorporated herein by reference.

The sputtered or melt processed alloy compositions can be processed further to produce powdered materials. For example, a ribbon or thin film of the alloy composition can be pulverized to form a powder. The powders typically have a maximum dimension of at least 1 micrometer, at least 2 micrometers, at least 5 micrometers, or at least 10 micrometers. Exemplary powders often have a maximum dimension that is no greater than 60 micrometers, no greater than 40 micrometers, or no greater than 20 micrometers. For example, suitable powders often have a maximum dimension of 1 to 60 micrometers, 10 to 60 micrometers, 20 to 60 micrometers, 40 to 60 micrometers, 1 to 40 micrometers, 2 to 40 micrometers, 10 to 40 micrometers, 5 to 20 micrometers, or 10 to 20 micrometers.

In some embodiments, the anode contains the alloy composition dispersed in an elastomeric polymer binder. Exemplary elastomeric polymer binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Specific examples of elastomeric polymer binders include terpolymers of vinylidene fluoride, tetrafluoroethylene, and propylene; and copolymers of vinylidene fluoride and hexafluoropropylene. Commercially available fluorinated elastomers include, but are not limited to, those sold by Dyneon, LLC, Oakdale, Minn. under the trade designation "FC-2178", "FC-2179", and "BRE-7131X".

In some anodes, the elastomeric binders are crosslinked. Crosslinking can improve the mechanical properties of the polymer and can improve the contact between the alloy composition and any electrically conductive diluent that may be present.

In other anodes, the binder is a polyimide such as the aliphatic or cycloaliphatic polyimides described in U.S. patent application Ser. No. 11/218,448, filed on Sep. 1, 2005. Such polyimide binders have repeating units of Formula II

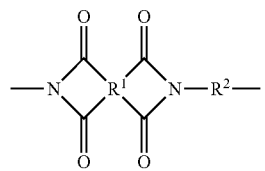

where $R^1$ is aliphatic or cycloaliphatic; and $R^2$ is aromatic, aliphatic, or cycloaliphatic.

The aliphatic or cycloaliphatic polyimide binders may be formed, for example, using a condensation reaction between an aliphatic or cycloaliphatic polyanhydride (e.g., a dianhydride) and an aromatic, aliphatic or cycloaliphatic polyamine (e.g., a diamine or triamine) to form a polyamic acid, followed by chemical or thermal cyclization to form the polyimide. The polyimide binders may also be formed using reaction mixtures additionally containing aromatic polyanhydrides (e.g., aromatic dianhydrides), or from reaction mixtures containing copolymers derived from aromatic polyanhydrides (e.g., aromatic dianhydrides) and aliphatic or cycloaliphatic polyanhydrides (e.g., aliphatic or cycloaliphatic dianhydrides). For example, about 10 to about 90 percent of the imide groups in the polyimide may be bonded to aliphatic or cycloaliphatic moieties and about 90 to about 10 percent of the imide groups may be bonded to aromatic moieties. Representative aromatic polyanhydrides are described, for example, in U.S. Pat. No. 5,504,128 (Mizutani et al.).

An electrically conductive diluent can be mixed with the alloy composition in the anode. Exemplary electrically conductive diluents include, but are not limited to, carbon, metal, metal nitrides, metal carbides, metal silicides, and metal borides. In some anodes, the electrically conductive diluents are carbon blacks such as those commercially available from MMM Carbon of Belgium under the trade designation "SUPER P" and "SUPER S" and from Chevron Chemical Co. of Houston, Tex. under the trade designation "SHAWINIGAN BLACK"; acetylene black; furnace black; lamp black; graphite; carbon fibers; or combinations thereof.

The anode can further include an adhesion promoter that promotes adhesion of the alloy composition and the electrically conductive diluent to the elastomeric polymer binder. The combination of an adhesion promoter and elastomeric polymer binder accommodates, at least partially, volume changes that may occur in the alloy composition during repeated cycles of lithiation and delithiation. The adhesion promoter can be part of the binder (e.g., in the form of a functional group) or can be in the form a coating on the alloy composition, the electrically conductive diluent, or a combination thereof. Examples of adhesion promoters include, but are not limited to, silanes, titanates, and phosphonates as described in U.S. Patent Application 2003/0058240, the disclosure of which is incorporated herein by reference.

The anode can be partially lithiated prior to or during the battery assembly process. Adding lithium to the anode can increase the energy delivered by the battery during discharging. In some embodiments, the anode is partially lithiated by dispersing a lithium powder, the alloy composition, and a conductive diluent in a solution of a polymer binder. The dispersion can be coated, dried to remove any solvent, and cured to form the electrode. In other embodiments, lithium foil or a lithium metal powder can be added to the surface of a previously cured electrode. In the case of a lithium metal powder, the powder can be distributed 1) by sprinkling the powder directly onto the surface of the electrode or 2) by dispersing the lithium metal powder in a volatile solvent that is non-reactive, followed by evenly coating the lithium dispersion onto the electrode surface and evaporating off the solvent. The lithium foil or lithium metal powder can then be affixed to the electrode by a calendaring process. Although anodes that contain lithium can be heated before battery assembly to react the lithium with the other components of the anode, such anodes are typically assembled into batteries without heating. During the battery assembly process, the lithium can react with the other components of the anode coating when electrolyte is added.

Any suitable electrolyte can be included in the lithium ion battery. The electrolyte can be in the form of a solid or liquid. Exemplary solid electrolytes include polymeric electrolytes such as polyethylene oxide, polytetrafluoroethylene, polyvinylidene fluoride, fluorine-containing copolymers, polyacrylonitrile, or combinations thereof. Exemplary liquid electrolytes include ethylene carbonate, dimethyl carbonate, diethyl carbonate, propylene carbonate, gamma-butyrolactone, tetrahydrofuran, 1,2-dimethoxyethane, dioxolane, 4-fluoro-1, 3-dioxalan-2-one, or combinations thereof. The electrolyte includes a lithium electrolyte salt such as $LiPF_6$, $LiBF_4$, $LiClO_4$, $LiN(SO_2CF_3)_2$, $LiN(SO_2CF_2CF_3)_2$, and the like.

The electrolyte can include a redox shuttle molecule, an electrochemically reversible material that during charging can become oxidized at the cathode, migrate to the anode where it can become reduced to reform the unoxidized (or less-oxidized) shuttle species, and migrate back to the cathode. Exemplary redox shuttle molecules include those described in U.S. Pat. No. 5,709,968 (Shimizu), U.S. Pat. No. 5,763,119 (Adachi), U.S. Pat. No. 5,536, 599 (Alamgir et al.), U.S. Pat. No. 5,858,573 (Abraham et al.), U.S. Pat. No. 5,882, 812 (Visco et al.), U.S. Pat. No. 6,004,698 (Richardson et al.), U.S. Pat. No. 6,045,952 (Kerr et al.), and U.S. Pat. No. 6,387, 571 B1 (Lain et al.); in PCT Published Patent Application No. WO 01/29920 A1 (Richardson et al.); and in U.S. patent application Ser. Nos., 11/130850 filed on May 17, 2005 (Dahn et al.) and Ser. No. 11/130849 filed on May 17, 2005 (Dahn et al.); U.S. Provisional Patent Application, 60/743, 314 filed on Feb. 17, 2006 (Dahn et al.); and U.S. Patent Application Publication No. 2005-0221196A1.

Any suitable cathode known for use in lithium ion batteries can be utilized. Some exemplary cathodes contain lithium atoms intercalated within a lithium transition metal oxide such as lithium cobalt dioxide, lithium nickel dioxide, and lithium manganese dioxide. Other exemplary cathodes are disclosed in U.S. Pat. No. 6,680,145 B2 (Obrovac et al.), incorporated herein by reference, and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers. Suitable lithium-containing grains can be selected from lithium oxides, lithium sulfides, lithium halides (e.g., chlorides, bromides, iodides, or fluorides), or combinations thereof. These particles can be used alone or in combination with a lithium-transition metal oxide material such as lithium cobalt dioxide.

In some lithium ion batteries with solid electrolytes, the cathode can include $LiV_3O_8$ or $LiV_2O_5$. In other lithium ion batteries with liquid electrolytes, the cathode can include $LiCoO_2$, $LiCo_{0.2}Ni0.8O_2$, $LiMn_2O_4$, $LiFePO_4$, or $LiNiO_2$.

The lithium ion batteries can be used as a power supply in a variety of applications. For example, the lithium ion batteries can be used in power supplies for electronic devices such as computers and various hand-held devices, motor vehicles, power tools, photographic equipment, and telecommunication devices. Multiple lithium ion batteries can be combined to provide a battery pack.

EXAMPLES

Aluminum, silicon, iron, titanium, zirconium, calcium, and cobalt were obtained in an elemental form having high purity (99.8 weight percent or greater) from Alfa Aesar, Ward Hill, MA or from Aldrich, Milwaukee, Wis. A mixture of rare earth elements, also known as mischmetal (MM), was obtained from Alfa Aesar with 99.0 weight percent minimum rare earth content which contained approximately 50 weight percent cerium, 18 weight percent neodymium, 6 weight percent praseodymium, 22 weight percent lanthanum, and 4 weight percent other rare earth elements.

The alloy compositions were formed into electrodes and characterized in electrochemical cells using a lithium metal counter electrode.

Example 1

7.715 g of aluminum shot, 11.314 g of tin shot, 2.075 g calcium shot, and 7.254 g mischmetal (MM) chunks were melted together on a carbon hearth in an argon filled arc furnace purchased from Advanced Vacuum Systems, Ayer, Mass. The resulting ingot, which had an alloy composition of $Al_{60}Sn_{20}(MM)_{15}Ca_5$, was broken into pieces having dimensions of about 1 cm in all directions.

The ingots were then further processed by melt spinning in an apparatus that included a vacuum chamber having a cylindrical quartz glass crucible (16 mm internal diameter and 140 mm length) with a 0.35 mm orifice positioned above a rotating cooling wheel. The rotating cooling wheel (10 mm thick and 203 mm diameter) was fabricated from a copper alloy (Ni—Si—Cr—Cu C18000 alloy, 0.45 weight percent chromium, 2.4 weight percent nickel, 0.6 weight percent silicon with the balance being copper) that is commercially available from Nonferrous Products, Inc., Franklin, Ind. Prior to processing, the edge surface of the cooling wheel was polished with a rubbing compound (commercially available from 3M, St. Paul, Minn. under the trade designation IMPERIAL MICROFINISHING) and then wiped with mineral oil to leave a thin film.

After placing 15 g of the ingots in the crucible, the melt spinning apparatus was evacuated to 80 mT (milliTorr) and then filled with helium gas to 200 T. The ingot was melted using radio frequency induction. As the temperature reached 1300° C., 400 T helium pressure was applied to the surface of the molten alloy composition and the alloy composition was extruded through a nozzle onto the spinning (5031 revolutions per minute) cooling wheel. Ribbon strips were formed that had a width of 1 mm and a thickness of 10 micrometers.

FIG. 1 shows the x-ray diffraction (XRD) pattern of the resulting melt-spun ribbon sample taken with a Siemens D500 x-ray diffractometer equipped with a copper target ($K\alpha 1$, $K\alpha 2$ lines). The XRD pattern shows that the resulting alloy was completely amorphous (i.e., there are no sharp peaks indicative of crystalline material).

The following components were added to a 40 ml tungsten carbide milling vessel containing two 10 mm diameter carbide balls and ten 3 mm diameter tungsten carbide balls: 1.60 g of the above melt-spun ribbon, 240 mg of SUPER P carbon (available from MMM Carbon, Belgium), 0.80 g of a polyimide coating solution (commercially available from HD Microsystems, Parlin, N.J. under the trade designation PYRALIN IP2555 as a 20 weight percent solution in N-methyl-2-pyrrolidinone), and 5.2 g of N-methyl-2-pyrrolidinone (commercially available from Aldrich, Milwaukee, Wis.). The milling vessel was placed in a planetary mill (PULVERISETTE 7, commercially available from Fritsch GmbH, Idon-Oberstein, Germany) and the contents were milled at a setting of "4" for one hour.

After milling, the sample was coated using a notched coating bar onto a 15 micrometer thick copper foil as a strip having a width of 25 mm and a thickness of 125 micrometers. The coating strip was cured at 150° C. under vacuum for 2.5 hours to form an electrode. The electrode was then used to construct a 2325 coin cell having a 300 micrometer thick metallic lithium foil counter/reference electrode, two layers of a flat sheet polypropylene membrane separator (CELGARD 2400 commercially available from CELGARD Inc., Charlotte, N.C.), and 1 M $LiPF_6$ in a 1:2 mixture of ethylene carbonate and diethyl carbonate as the electrolyte. The 2325 coin cell hardware is further described in A. M. Wilson and J. R. Dahn, *J Electrochem. Soc.*, 142, 326-332 (1995).

Figure 2:
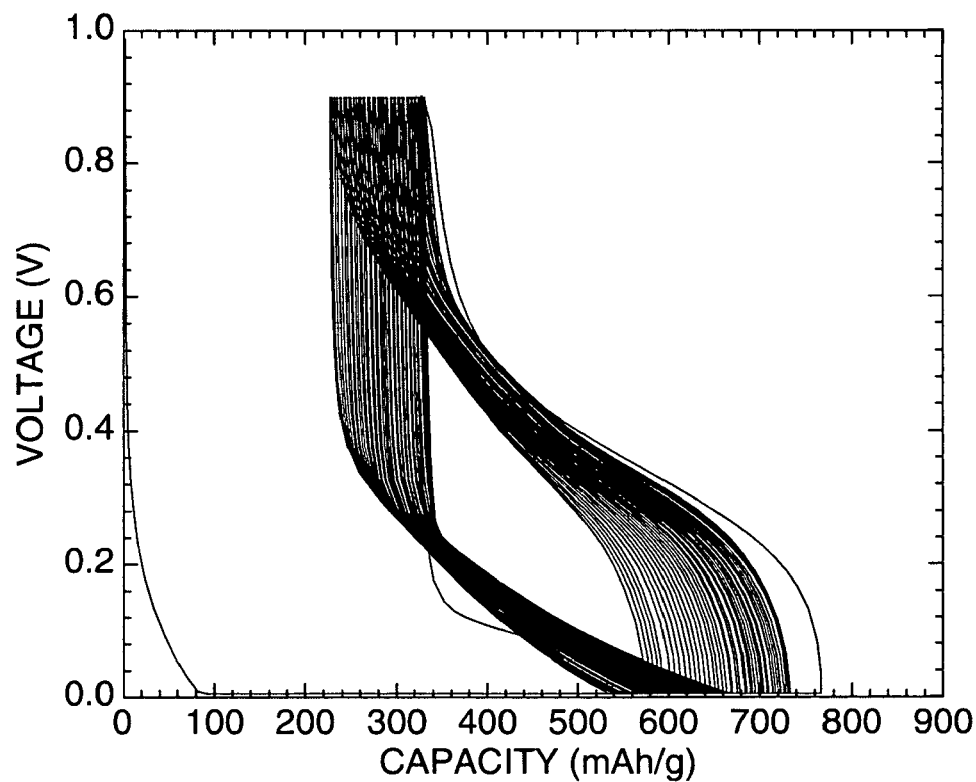
FIG. 2 is a plot of voltage versus capacity of an electrochemical cell having an electrode that contains an alloy composition of $Al_{60}Sn_{20}(MM)_{15}Ca_5$.

The electrochemical cell was cycled between 0.9 V versus the metallic Li/Li ion reference electrode and 5 mV versus the metallic Li/Li ion reference electrode at a constant current of 100 mA/g (500 µA) using a cell tester (Maccor Inc., Tulsa Okla.). The current was allowed to relax to 10 mA/g (50 µA) at the lower voltage cutoff before the next charge cycle. The plot of voltage versus capacity is shown in FIG. 2. The specific capacity was 425 mAh/g.

Example 2

Figure 3:
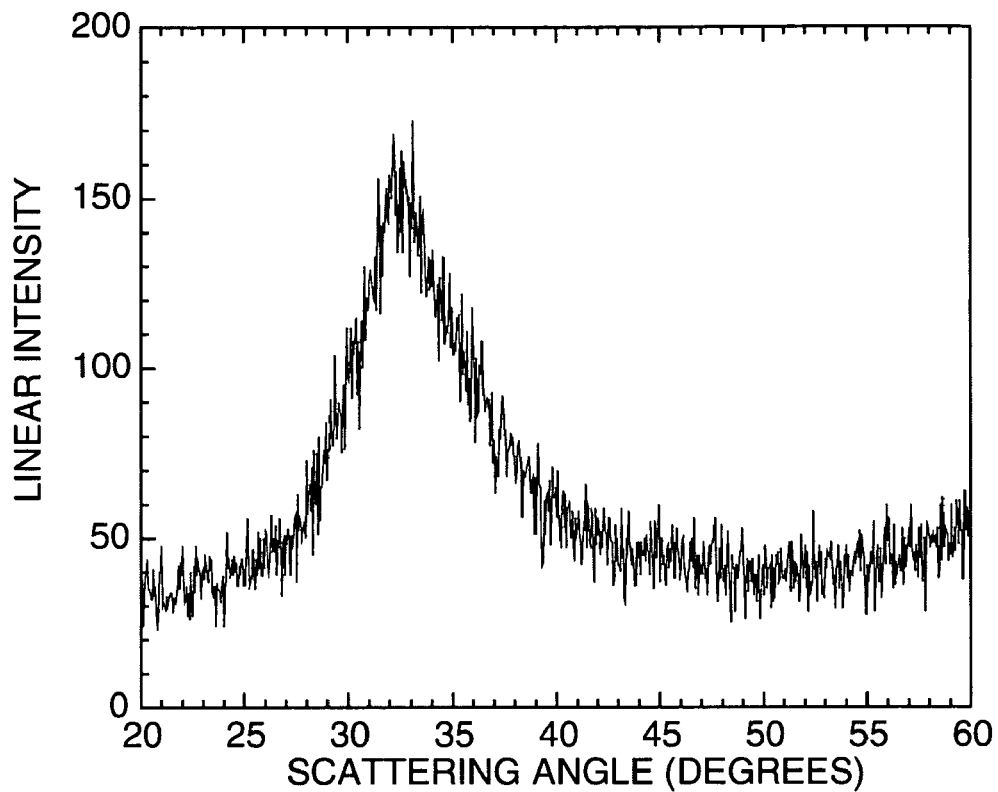
FIG. 3 is a x-ray diffraction pattern of an exemplary alloy composition of $Al_{55}Si_5Sn_{20}(MM)_{15}Ca_5$.
Figure 4:
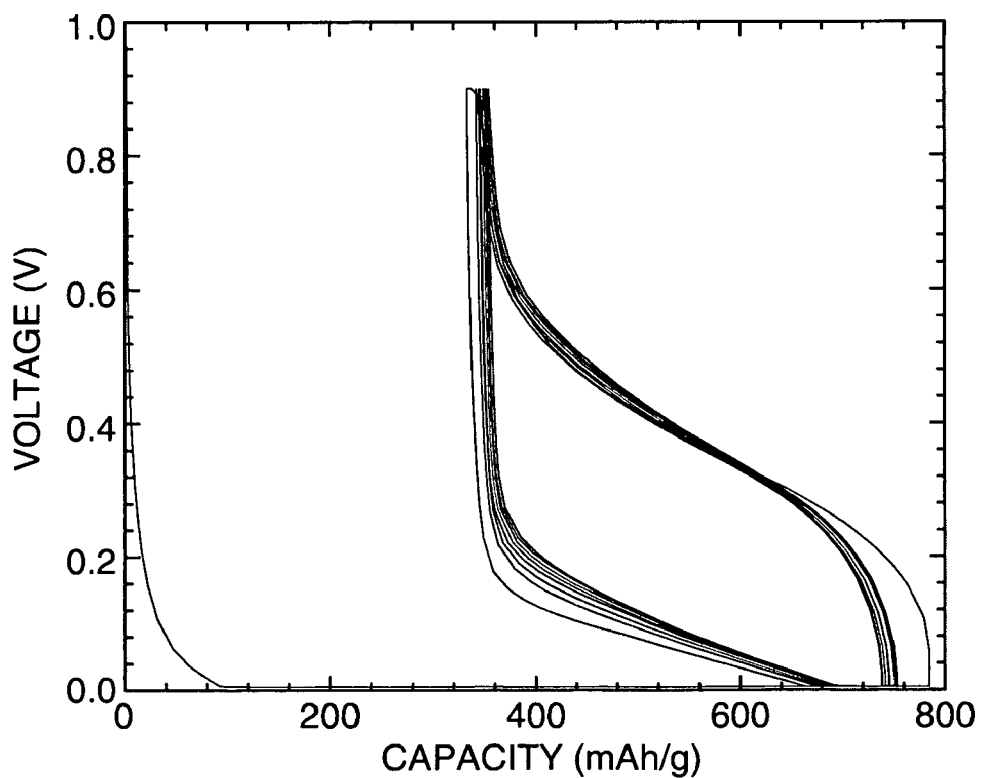
FIG. 4 is a plot of voltage versus capacity of an electrochemical cell having an electrode that contains an alloy composition of $Al_{55}Si_5Sn_{20}(MM)_{15}Ca_5$.

A meltspun alloy was prepared in a manner similar to Example 1 except that 0.669 g of Si chips, 7.066 g of aluminum shot, 11.304 g of tin shot, 0.954 g Ca shot, and 10.007 g of misch metal were melted together in the arc furnace to make the initial ingot. The ingot had an alloy composition of $Al_{55}Si_5Sn_{20}(MM)_{15}Ca_5$. The x-ray diffraction pattern of the resulting meltspun alloy ribbon is shown in FIG. 3. The XRD pattern shows that the alloy composition was amorphous (i.e., there are no sharp peaks indicative of a crystalline material). Electrochemical testing was carried out on this alloy composition as described for Example 1. The plot of voltage versus capacity is shown in FIG. 4. The specific capacity was 400 mAh/g.

Examples 3-31 and Comparative Examples (CE) 1-35

Combinatorial Sputtering of Compositions of Aluminum, Tin and Rare Earth Elements Combinatorial sputtering was used to prepare and screen the structural and performance characteristics of 64 ternary compositions of aluminum, tin, and rare earth elements.

A mischmetal (MM) sputtering target was obtained from Metall Rare Earth Limited, Shenzhen, China. The target, which was analyzed using an electron microprobe, contained 26.3 weight percent lanthanum, 53.4 weight percent cerium, 4.7 weight percent praseodymium, 14.2 weight percent neodymium, 1.3 weight percent iron, and a trace amount of magnesium. Aluminum and tin sputtering targets of 99.9 weight percent purity were obtained from Williams Advanced Materials, Buffalo, N.Y. All the targets, which had a diameter of 5.08 cm and a thickness of either 0.32 cm (for MM and tin) or 0.64 cm (for aluminum), were mounted on 0.32 cm thick copper backing plates using SILVER TECH PT-1 silver epoxy available from Williams Advanced Materials, Buffalo, N.Y.

Aluminum and tin targets were energized using MDX-lK DC power supplies, available from Advanced Energy, Fort Collins, Colo. The mischmetal target was energized using an RFX-600 RF power supply from Advanced Energy. Target powers (aluminum—80 watts; tin—32 watts; and (MM)—80 watts) were adjusted to form the desired composition range, $Al_{1-x-y}Sn_x(MM)_y$ with $0<x<0.5$ and $0<y<0.4$.

Five identical 76 mm by 76 mm libraries were prepared that spanned a relatively large composition space in a single experiment. The combinatorial preparation process is further described in Dahn et al, *Chem. Mat.*, 14, 3519 (2002). Two of the five libraries were directly deposited on the electrode pads of a 64-electrode (8 by 8 array) combinatorial electrochemical cell base plate as described in M. D. Fleischauer et al., *J of the Electrochemical Soc.*, 150, A1465-A1469 (2003). The base plate was then assembled in to a combinatorial electrochemical cell and tested using the equipment described in V. K. Cumyn et al., *Electrochem. Solid State Lett.*, 6, E15-E8 (2003). The third of the five libraries was deposited onto silicon wafers for characterization by rapid x-ray diffraction to determine the range of compositions in the libraries that were amorphous as described in Dahn et al, *Chem. Mat.*, 14, 3519 (2002). The fourth of the five libraries was deposited on copper foil for determining the atomic composition as a function of position in the library using electron microprobe analysis as described in Dahn et al, *Chem. Mat.*, 14, 3519 (2002). The fifth library was deposited on a 4 by 4 array of pre-weighed aluminum foil disks and was used to extract the mass per unit area deposited as a function of position in the library.

The data for the 64 samples is summarized in Table 1. The amount of Sn, Al, and (MM) in the sputtered samples was determined by electron microprobe analysis. The samples were analyzed using x-ray diffraction (XRD). The samples that were amorphous are indicated with a "yes" in Table 1. The specific capacity was calculated from data obtained during the second discharge.

TABLE I

Sn—Al-(MM) Alloys

| Example or Comparative Example (CE) | Atomic % Sn | Atomic % Al | Atomic % MM | Specific Capacity (mAh/g) | XRD amorphous |
|---|---|---|---|---|---|
| 3 | 10 | 51 | 39 | 22 | Yes |
| 4 | 8 | 55 | 37 | 30 | Yes |
| 5 | 8 | 61 | 31 | 38 | Yes |
| 6 | 8 | 65 | 27 | 72 | Yes |
| 7 | 8 | 70 | 22 | 70 | Yes |
| 8 | 9 | 74 | 17 | 301 | Yes |
| CE1 | 12 | 76 | 12 | 412 | No |
| CE2 | 15 | 77 | 8 | 472 | No |
| 9 | 13 | 47 | 40 | 64 | Yes |
| 10 | 13 | 52 | 35 | 66 | Yes |
| 11 | 12 | 58 | 30 | 77 | Yes |
| 12 | 12 | 62 | 26 | 104 | Yes |
| 13 | 12 | 67 | 21 | 197 | Yes |
| 14 | 14 | 71 | 15 | 384 | Yes |
| CE3 | 18 | 72 | 10 | 447 | No |
| CE4 | 21 | 74 | 5 | 468 | No |
| CE5 | 18 | 46 | 36 | 109 | No |
| 15 | 18 | 49 | 33 | 102 | Yes |
| 16 | 17 | 54 | 29 | 107 | Yes |
| 17 | 19 | 59 | 22 | 303 | Yes |
| 18 | 19 | 63 | 18 | 401 | Yes |
| 19 | 19 | 67 | 14 | 477 | Yes |
| CE6 | 24 | 68 | 8 | 432 | No |
| CE7 | 27 | 69 | 4 | 451 | No |
| CE8 | 22 | 44 | 34 | 144 | |
| 20 | 23 | 47 | 30 | 154 | Yes |
| 21 | 22 | 52 | 26 | 243 | Yes |
| 22 | 24 | 55 | 21 | 371 | Yes |
| 23 | 24 | 59 | 17 | 428 | Yes |
| 24 | 24 | 63 | 13 | 472 | Yes |
| CE9 | 31 | 63 | 6 | 518 | No |
| CE10 | 33 | 63 | 4 | 476 | No |
| CE11 | 26 | 41 | 33 | 235 | No |
| 25 | 27 | 45 | 28 | 289 | Yes |
| 26 | 27 | 49 | 24 | 314 | Yes |
| 27 | 28 | 52 | 20 | 302 | Yes |
| 28 | 29 | 55 | 16 | 412 | Yes |
| CE12 | 29 | 59 | 12 | 445 | No |
| CE13 | 34 | 60 | 6 | 554 | No |
| CE14 | 39 | 58 | 3 | 340 | No |
| CE15 | 30 | 39 | 31 | 318 | No |
| CE16 | 31 | 42 | 27 | 177 | No |
| 29 | 31 | 45 | 24 | 308 | Yes |
| 30 | 32 | 48 | 20 | 388 | Yes |
| CE17 | 34 | 51 | 15 | 352 | No |
| CE18 | 35 | 54 | 11 | 460 | No |
| CE19 | 39 | 55 | 6 | 493 | No |
| CE20 | 43 | 55 | 2 | 671 | No |
| CE21 | 34 | 37 | 29 | 159 | No |
| CE22 | 35 | 39 | 26 | 174 | No |
| CE23 | 36 | 42 | 22 | 311 | No |
| 31 | 37 | 45 | 18 | 327 | Yes |
| CE24 | 39 | 47 | 14 | 341 | No |
| CE25 | 41 | 49 | 10 | 402 | No |
| CE26 | 44 | 50 | 6 | 356 | No |
| CE27 | 46 | 50 | 4 | | No |
| CE28 | 35 | 35 | 30 | 189 | No |
| CE29 | 37 | 38 | 25 | 235 | No |
| CE30 | 39 | 40 | 21 | 327 | No |
| CE31 | 42 | 42 | 16 | 278 | No |
| CE32 | 44 | 44 | 12 | 307 | No |
| CE33 | 46 | 45 | 9 | 422 | No |
| CE34 | 48 | 46 | 6 | 346 | No |
| CE35 | 47 | 49 | 4 | 273 | No |

Figure 5:
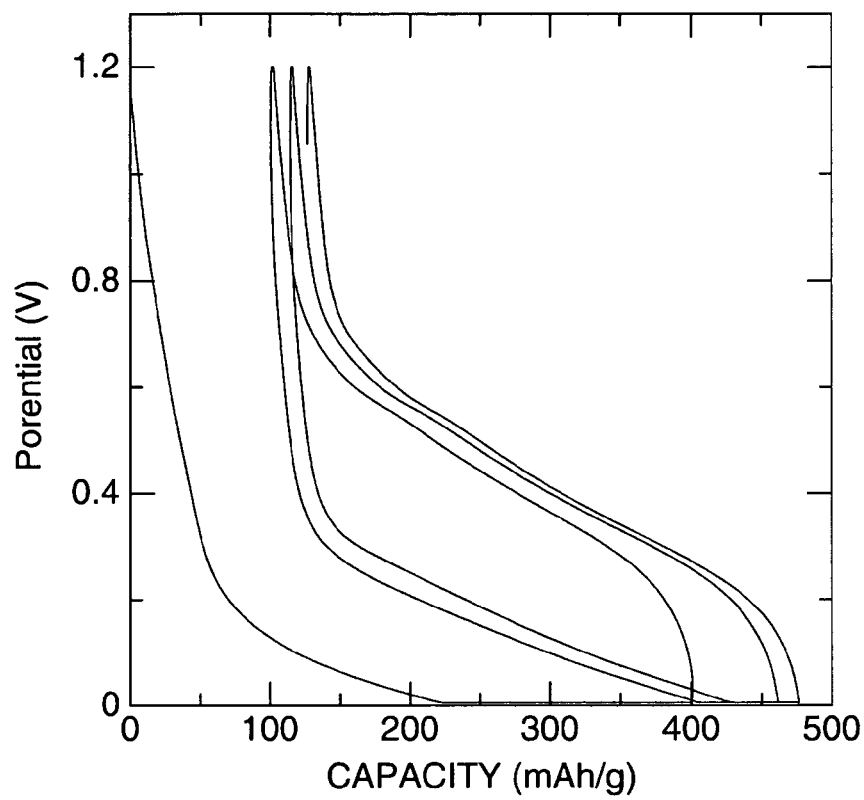
FIG. 5 is a plot of voltage versus capacity of an electrochemical cell having an electrode that contains an alloy composition of $Al_{55}Sn_{29}(MM)_{16}$.

FIG. 5 shows the potential versus specific capacity for Example 28. The electrode made in this example had a reversible capacity of 412 mAh/g and an irreversible capacity of about 100 mAh/g.

Figure 6:
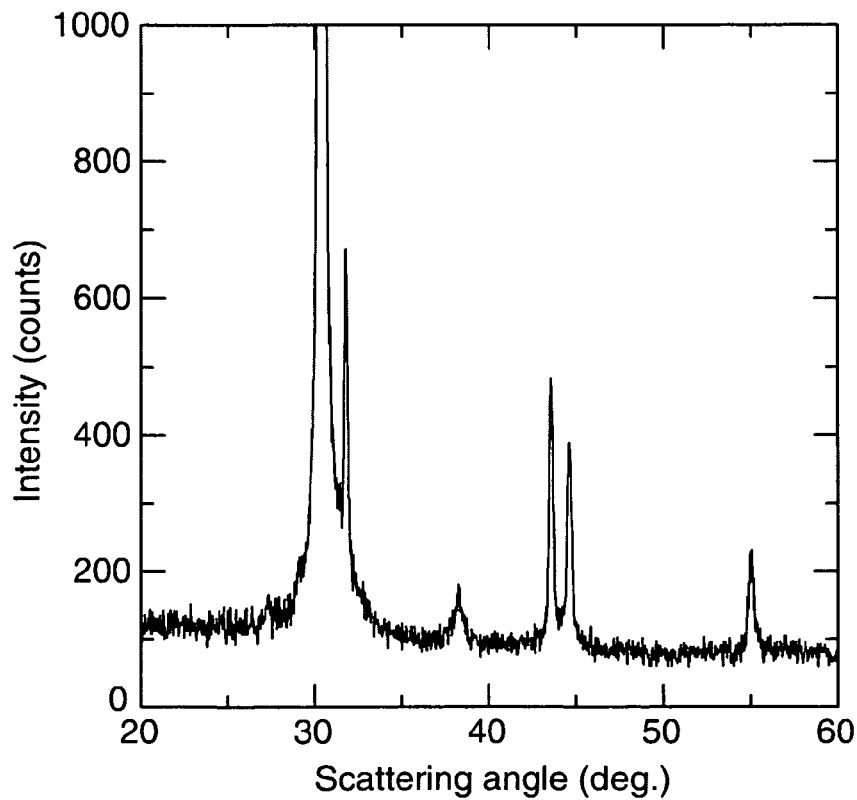
FIG. 6 is the x-ray diffraction pattern of a comparative example that contains some crystalline material.
Figure 7:
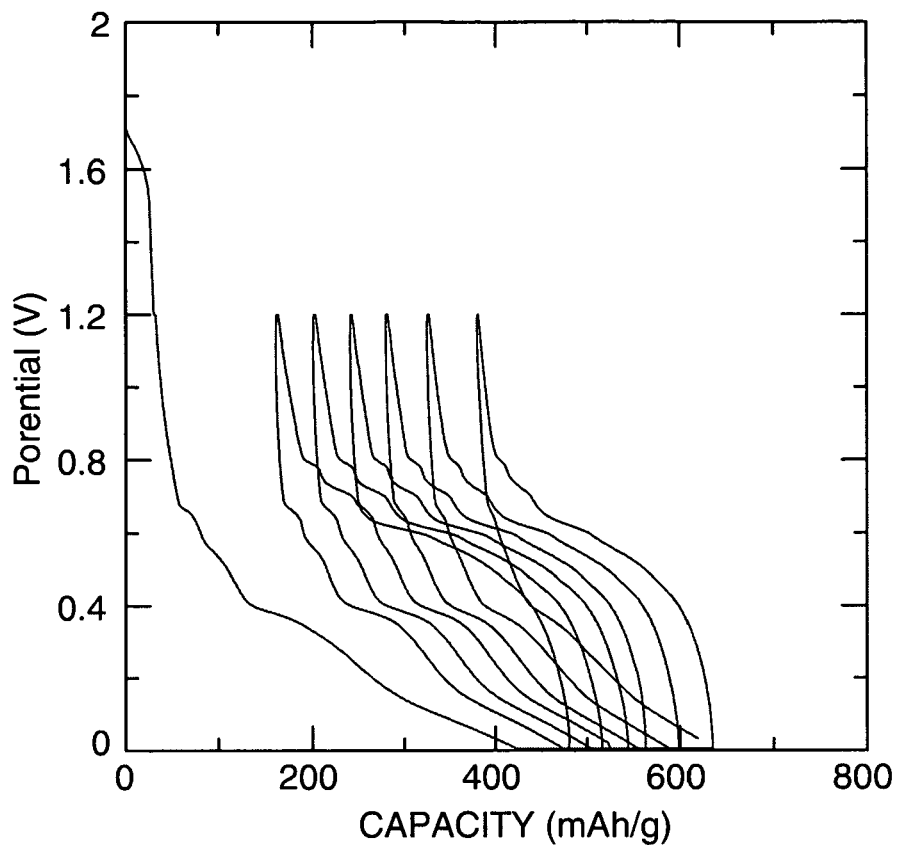
FIG. 7 is a plot of voltage versus capacity of an electrochemical cell having an electrode of a comparative example that contains some crystalline material.

The x-ray diffraction pattern for Comparative Example 26 is shown in FIG. 6. This material has a relatively sharp x-ray diffraction peak, which is indicative of a crystalline material rather than of an amorphous material. FIG. 7 shows the potential versus specific capacity for Comparative Example 26. The capacity decreased significantly with each successive cycle of lithiation and delithiation.

Examples 32-62 and Comparative Examples 36-62

Combinatorial Sputtering of Compositions of Silicon, Tin and Rare Earth Elements Combinatorial sputtering was used to prepare 64 ternary compositions of silicon, tin and rare earth oxides using the methodology described above for aluminum, tin, and rare earth elements. The procedure was similar to that described for Examples 3-31 and Comparative Examples 1-35. The mischmetal and tin targets were identical to those described above. The silicon target of 99.9 weight percent purity was obtained from Williams Advanced Materials, Buffalo, N.Y. The silicon target had a thickness of 0.64 cm and a diameter of 5.08 cm.

The silicon and tin targets were energized using MDX-lK DC power supplies, available from Advanced Energy, Fort Collins, Colo. The (MM) target was energized using an RFX-600 RF power supply from Advanced Energy. Target powers (silicon–120 watts; tin—48 watts; and (MM)—60 watts) were adjusted to form the desired composition range, $Si_{1-x-y}Sn_x(MM)_y$, with $0<x<0.5$ and $0<y<0.4$.

The data for the 64 samples is summarized in Table II. The amount of Sn, Si, and (MM) in the sputtered samples was determined by electron microprobe analysis. The samples were analyzed using x-ray diffraction (XRD). The samples that were amorphous are indicated with a "yes" in Table II. The specific capacity was calculated from data obtained during the second discharge.

TABLE II

Sn—Si-(MM) Alloys

| Example or Comparative Example (CE) | Atomic % Sn | Atomic % Si | Atomic % MM | Specific capacity (mAh/g) | Amorphous |
|---|---|---|---|---|---|
| 32 | 12 | 52 | 36 | | Yes |
| 33 | 12 | 56 | 32 | 611 | Yes |
| 34 | 11 | 62 | 27 | 695 | Yes |
| 35 | 12 | 66 | 22 | 859 | Yes |
| 36 | 13 | 67 | 20 | 1057 | Yes |
| 37 | 14 | 73 | 13 | 1317 | Yes |
| 38 | 15 | 75 | 10 | 1582 | Yes |
| 39 | 18 | 75 | 7 | 1329 | Yes |
| 40 | 18 | 52 | 30 | 728 | Yes |
| 41 | 18 | 56 | 26 | 813 | Yes |
| 42 | 19 | 61 | 20 | 902 | Yes |
| 43 | 20 | 64 | 16 | 1126 | Yes |
| 44 | 21 | 68 | 11 | 1358 | Yes |
| 45 | 23 | 70 | 7 | 1657 | Yes |
| 46 | 26 | 71 | 3 | 1137 | Yes |
| 47 | 22 | 46 | 32 | 747 | Yes |
| 48 | 26 | 48 | 26 | 733 | Yes |
| 49 | 25 | 52 | 23 | 883 | Yes |
| 50 | 26 | 55 | 19 | 1038 | Yes |
| 51 | 28 | 57 | 15 | 1152 | Yes |
| 52 | 29 | 61 | 10 | 1518 | Yes |
| 53 | 32 | 63 | 5 | 1605 | Yes |
| 54 | 25 | 44 | 31 | 544 | Yes |
| 55 | 32 | 44 | 24 | 817 | Yes |
| 56 | 31 | 48 | 21 | 875 | Yes |
| 57 | 32 | 51 | 17 | 957 | Yes |
| 58 | 35 | 52 | 13 | 1117 | Yes |
| 59 | 38 | 57 | 5 | 1556 | Yes |
| CE36 | 40 | 58 | 2 | 562 | No |
| 60 | 37 | 41 | 22 | 825 | Yes |
| 61 | 37 | 43 | 20 | 889 | Yes |
| 62 | 40 | 45 | 15 | 1001 | Yes |
| CE37 | 42 | 47 | 11 | 1074 | No |
| CE38 | 43 | 50 | 7 | 1320 | No |
| CE39 | 45 | 51 | 4 | 1458 | No |
| CE40 | 46 | 52 | 2 | 835 | No |
| CE41 | 38 | 37 | 25 | 500 | No |
| CE42 | 42 | 37 | 21 | 736 | No |
| CE43 | 43 | 40 | 17 | 765 | No |
| CE44 | 45 | 41 | 14 | 843 | No |
| CE45 | 47 | 42 | 11 | 1032 | No |
| CE46 | 49 | 44 | 7 | 1121 | No |
| CE47 | 51 | 45 | 4 | 1397 | No |
| CE48 | 52 | 46 | 2 | 900 | No |
| CE49 | 43 | 35 | 22 | 159 | No |
| CE50 | 46 | 35 | 19 | 716 | No |
| CE51 | 50 | 37 | 13 | 846 | No |
| CE52 | 53 | 38 | 9 | 930 | No |
| CE53 | 54 | 39 | 7 | 1104 | No |
| CE54 | 56 | 41 | 3 | 1175 | No |
| CE55 | 56 | 42 | 2 | 889 | No |
| CE56 | 48 | 34 | 18 | 790 | No |
| CE57 | 51 | 34 | 15 | 847 | No |
| CE58 | 54 | 33.5 | 12.5 | 892 | No |
| CE59 | 57 | 34 | 9 | 947 | No |
| CE60 | 58 | 35 | 7 | 1092 | No |
| CE61 | 58 | 37 | 5 | 1168 | No |
| CE62 | 59 | 39 | 2 | 1118 | No |

Figure 8:
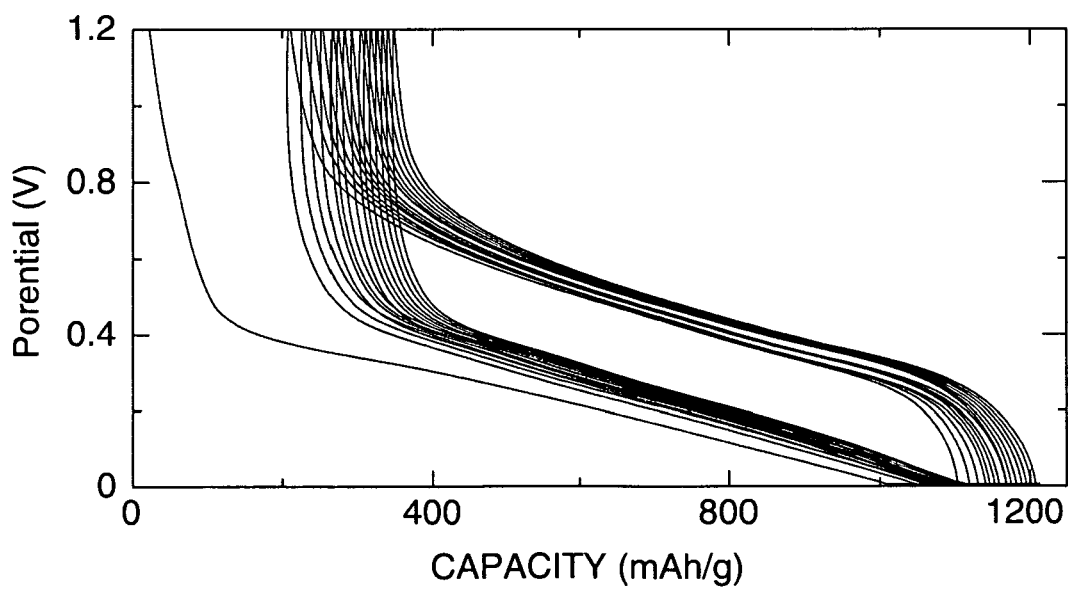
FIG. 8 is a plot of voltage versus capacity of an electrochemical cell having an electrode that contains an alloy composition of $Si_{52}Sn_{35}(MM)_{13}$.

FIG. 8 shows the potential versus specific capacity for example 58. The electrode made in this example has a reversible capacity of 1117 mAh/g and an irreversible capacity of about 200 mAh/g.

We claim:

1. A lithium ion battery comprising a cathode, an anode, and an electrolyte that is electrical communication with both the anode and the cathode, wherein the anode comprises an alloy composition that is amorphous, the alloy composition comprising
   a) tin in an amount of 1 to 50 mole percent;
   b) a second element comprising silicon, aluminum, or a combination thereof, wherein the second element is present in an amount of 20 to 95 mole percent; and
   c) a third element comprising yttrium, a lanthanide element, actinide element, or a combination thereof in an amount of at least 3 mole percent and an optional alkaline earth element, wherein the third element is present in an amount of 3 to 50 mole percent,
   wherein the alloy composition is substantially free of transition metal,
   wherein each mole percent is based on a total number of moles of all elements in the alloy composition except lithium, and
   wherein an x-ray diffraction pattern of the alloy composition has broad peaks having a maximum width at half of the maximum peak height of at least 5 degrees two theta.

2. The lithium ion battery of claim 1, wherein the third element comprises cerium, lanthanum, praseodymium, neodymium, or a combination thereof.

3. The lithium ion battery of claim 2, wherein the third element further comprises an alkaline earth element comprising magnesium, calcium, strontium, barium, or a combination thereof.

4. The lithium ion battery of claim 1, wherein the alloy composition comprises particles having a maximum dimension of 1 micrometers to 60 micrometers.

5. The lithium ion battery of claim 1, wherein the alloy composition further comprises an alkaline metal.

6. The lithium ion battery of claim 1, wherein the alloy composition comprises less than 1 mole percent of a transition metal based on the moles of the alloy composition.

7. The lithium ion battery of claim 1, wherein the alloy composition is of Formula I:

$$Sn_aSi_bAl_cM_dA_eT_fLi_g \quad (I)$$

wherein
a is an number in the range of 1 to 50;
b is a number in the range of 0 to 95;
c is a number in the range of 0 to 95;
b+c is a number in the range of 20 to 95;
M is yttrium, a lanthanide, actinide element, or a combination thereof;
d is a number in the range of 3 to 50;
A is an alkaline earth element;
e is a number in the range of 0 to 20;
d+e is a number in the range of 3 to 50;
T is a transition metal;
f is a number in the range of 0 to 1;
g is a number in the range of 0 to [4.4(a+b)+c]; and
a+b+c+d+e+f is equal to 100.

8. The lithium ion battery of claim 7, wherein
a is a number in the range of 10 to 40;
b is a number in the range of 40 to 90;
c is a number in the range of 0 to 5;
d is a number in the range of 5 to 15;
e is a number in the range of 0 to 10; and
f is a number in the range of 0 to 1.

9. The lithium ion battery of claim 7, wherein
a is a number in the range of 10 to 40;
b is a number in the range of 0 to 5;
c is a number in the range of 40 to 90;
d is a number in the range of 10 to 20;
e is a number in the range of 0 to 10; and
f is a number in the range of 0 to 1.

10. The lithium ion battery of claim 7, wherein
a is a number in the range of 15 to 25;
b is a number in the range of 1 to 15;
c is a number in the range of 50 to 70;
d is a number in the range of 10 to 20;
e is a number in the range of 0 to 10; and
f is a number in the range of 0 to 1.

11. The lithium ion battery of claim 1, wherein the anode further comprises an organic binder comprising a polyimide.

12. The lithium ion battery of claim 1, wherein the anode further comprises lithium metal.

13. A battery pack comprising at least one lithium ion battery according to claim 1.

14. A method of preparing a lithium ion battery, said method comprising:
providing an amorphous alloy composition comprising
a) tin in an amount of 1 to 50 mole percent;
b) a second element comprising silicon, aluminum, or a combination thereof, wherein the second element is present in an amount of 20 to 95 mole percent; and
c) a third element comprising yttrium, a lanthanide element, an actinide element, or a combination thereof and an optional alkaline earth element, wherein the third element is present in an amount of 3 to 50 mole percent,
wherein the alloy composition is substantially free of transition metal,
wherein each mole percent is based on a total number of moles of all elements in the alloy composition except lithium; and
providing a cathode and an electrolyte, wherein the electrolyte is in electrical communication with both the cathode and the anode,
wherein an x-ray diffraction pattern of the alloy composition has broad peaks having a maximum width at half of the maximum peak height of at least 5 degrees two theta.

15. The method of claim 14, wherein providing the alloy composition comprises melt processing tin, the second element, and the third element.

16. The method of claim 14, wherein providing the alloy composition comprises sputtering tin, the second element, and the third element.

17. The method of claim 14, wherein the third element comprises cerium, lanthanum, praseodymium, neodymium, or a combination thereof.

18. The method of claim 14, wherein providing the alloy composition comprises forming particles having a maximum dimension of 1 micrometers to 60 micrometers.

19. The method of claim 14, wherein the alloy composition is of Formula I:

$$Sn_aSi_bAl_cM_dA_eT_fLi_g \quad (I)$$

wherein
a is an number in the range of 1 to 50;
b is a number in the range of 0 to 95;
c is a number in the range of 0 to 95;
b+c is a number in the range of 20 to 95;
M is yttrium, a lanthanide, an actinide element, or a combination thereof;
d is a number in the range of 3 to 50;
A is an alkaline earth element;
e is a number in the range of 0 to 20;
d+e is a number in the range of 3 to 50;
T is a transition metal;
f is a number in the range of 0 to 1;
g is a number in the range of 0 to [4.4(a+b)+c]; and
a+b+c+d+e+f is equal to 100.

20. An alloy composition comprising
a) tin in an amount of 1 to 50 mole percent;
b) a second element comprising silicon, aluminum, or a combination thereof, wherein the second element is present in an amount of 20 to 95 mole percent; and
c) a third element comprising yttrium, a lanthanide element, actinide element, or a combination thereof in an amount of at least 3 mole percent and an optional alkaline earth element, wherein the third element is present in an amount of 3 to 50 mole percent,
wherein the alloy composition is substantially free of transition metal,
wherein each mole percent is based on a total number of moles of all elements in the alloy composition except lithium,
wherein the alloy composition is amorphous, and
wherein an x-ray diffraction pattern of the alloy composition has broad peaks having a maximum width at half of the maximum peak height of at least 5 degrees two theta.

* * * * *

UNITED STATES PATENT AND TRADEMARK OFFICE
CERTIFICATE OF CORRECTION

PATENT NO.         : 7,767,349 B2
APPLICATION NO.    : 11/387557
DATED              : August 3, 2010
INVENTOR(S)        : Mark Nikolas Obrovac It is certified that error appears in the above-identified patent and that said Letters Patent is hereby corrected as shown below:

Column 1,
Line 4, delete "APPLICATIONS" and insert --APPLICATION-- therefor.

Column 8,
Line 40, after "6,203,944" delete "B 1" and insert --B1-- therefor.

Column 8,
Line 40, after "6,436,578" delete "B 1" and insert --B1-- therefor.

Column 11,
Line 26, delete "LiCo$_{0.2}$Ni0.8O$_2$," and insert --LiCo$_{0.2}$Ni$_{0.8}$O$_2$,-- therefor.

Column 12,
Line 30, delete "IP2555" and insert --PI2555-- therefor.

Column 12,
Line 49, delete "J" and insert --J.-- therefor.

Column 13,
Line 31, delete "MDX-lK" and insert --MDX-1K-- therefor.

Column 13,
Line 44, delete "J" and insert --J.-- therefor.

Column 15,
Line 22, delete "MDX-lK" and insert --MDX-1K-- therefor.

Signed and Sealed this
Thirtieth Day of August, 2011

David J. Kappos
*Director of the United States Patent and Trademark Office*